(12) United States Patent
Cohen

(10) Patent No.: US 11,544,797 B1
(45) Date of Patent: Jan. 3, 2023

(54) SYSTEMS AND METHODS FOR IMMUTABLE HISTORIC RECORDS FROM CLOUD STORAGE SYSTEMS

(71) Applicant: Stripe, Inc., San Francisco, CA (US)

(72) Inventor: Jonah Cohen, Seattle, WA (US)

(73) Assignee: STRIPE, INC., San Francisco, CA (US)

( * ) Notice: Subject to any disclaimer, the term of this patent is extended or adjusted under 35 U.S.C. 154(b) by 133 days.

(21) Appl. No.: 16/988,393

(22) Filed: Aug. 7, 2020

(51) Int. Cl.
*G06Q 40/00* (2012.01)
*G06F 16/23* (2019.01)
*G06Q 10/10* (2012.01)

(52) U.S. Cl.
CPC ......... *G06Q 40/12* (2013.12); *G06F 16/2379* (2019.01); *G06Q 10/10* (2013.01)

(58) Field of Classification Search
CPC ..... G06Q 40/12; G06Q 10/10; G06F 16/2379
See application file for complete search history.

(56) References Cited

U.S. PATENT DOCUMENTS

| | | | | |
|---|---|---|---|---|
| 11,165,787 | B2* | 11/2021 | Sloane | H04L 9/3239 |
| 11,249,985 | B2* | 2/2022 | Wu | G06F 16/2379 |
| 11,270,307 | B2* | 3/2022 | Wang | H04L 9/3297 |
| 2020/0073940 | A1* | 3/2020 | Grosset | G06F 16/258 |
| 2020/0204338 | A1* | 6/2020 | Bougalis | H04L 9/30 |
| 2020/0356991 | A1* | 11/2020 | Saraniecki | H04L 9/0637 |
| 2020/0396072 | A1* | 12/2020 | Maurer | G06F 16/2379 |
| 2021/0081935 | A1* | 3/2021 | Faulkner | G06Q 20/3674 |
| 2021/0264526 | A1* | 8/2021 | Bryant | G06Q 30/0623 |

\* cited by examiner

*Primary Examiner* — Florian M Zeender
*Assistant Examiner* — Christopher R Buchanan
(74) *Attorney, Agent, or Firm* — Womble Bond Dickinson (US) LLP

(57) ABSTRACT

A method and apparatus for generating and using immutable records generated from transaction records maintained at a cloud storage system for transaction ledger generation are described. The method may include accessing transaction records in a transaction record data store maintained by a cloud services provider system, where each transaction record generated by the commerce platform in response to the commerce platform processing a transaction. The method further includes accessing a plurality of revenue records, each having a unique key. The method may also include generating a plurality of candidate ledger entries, each candidate ledger entry comprises at least a subset of the plurality of data fields from the revenue record data object, and determining whether a revenue record matches a candidate ledger entry based on a comparison of the unique key. Furthermore, when the comparison results in a match, a final ledger entry is generated from the candidate ledger entry for a period of time in which the revenue record was generated.

16 Claims, 5 Drawing Sheets

SYSTEMS AND METHODS FOR IMMUTABLE HISTORIC RECORDS FROM CLOUD STORAGE SYSTEMS

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers through their agents. This may include the merchant, agent, and other users establishing accounts with the commerce system. Once the accounts are established, merchants can run financial transactions using the services of the commerce system, the agents can accept payments from customers on behalf of the merchant for provided products and/or services, and the commerce system processes the accepted payments, performs payouts for services rendered, as well as other financial processing services. This processing may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant. Transaction records are created by the commerce system for each of these transactions defining aspects of the transaction, such as when the transaction occurred, an amount of the transaction, and what accounts are effected.

Merchant systems can then access a status of their account at the commerce platform, such as by requesting and obtaining a report of their account status for one or more periods of time, where the report details various account aspects including credits, debits, a beginning balance, and an ending balance. Such a report is similar to a ledge of transactions over the period of time associated with the requested report. Furthermore, such reports are typically used by the merchant systems to manage their financial accounting systems. Following traditional accounting principles and expectations of merchants for which a reports are created, a report for a period of time generated by commerce platform should not change no matter when the report for that period is generated (e.g., a ledger report for July 2020 should not change whether generated in August 2020, September 2020, August 2021, etc.).

However, modern distributed processing systems, such as the commerce system, often rely on external data storage solutions, such as cloud storage systems, to store transaction records and perform real time streaming and processing of transactions. Furthermore, some events have an impact on historic records (e.g. reversals, corrections, etc. of past transactions). Thus, when transaction records from which a status of a merchant account can be generated at the commerce platform are accessed periodically (e.g., hourly, daily, weekly, etc.), and historic transaction records are impacted by a future event (e.g., a correction, reversal, etc. of a past transaction record), it would be error to edit the transaction in the prior period which typically occurs using modern streaming transaction processing approaches. That is, the editing, changing, removal, etc. of a transaction record in a prior period due to a correction, edit, reversal, etc. in a later period would cause a potential mismatch in reports generated for a merchant (e.g. the Q1 2020 books generated at Period x and Period Y could be different) which is counter to the merchant's expectation. However, it is difficult to perform transaction record disambiguation given the cloud storage model (e.g. an original historic record may be identical to a future record referencing and impacting the historic record), and thus the future changes may inadvertently impact a prior reporting. Furthermore, given the volume of transactions from which transaction records are accessed for generating reporting, computing resource preservation is a vital concern.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
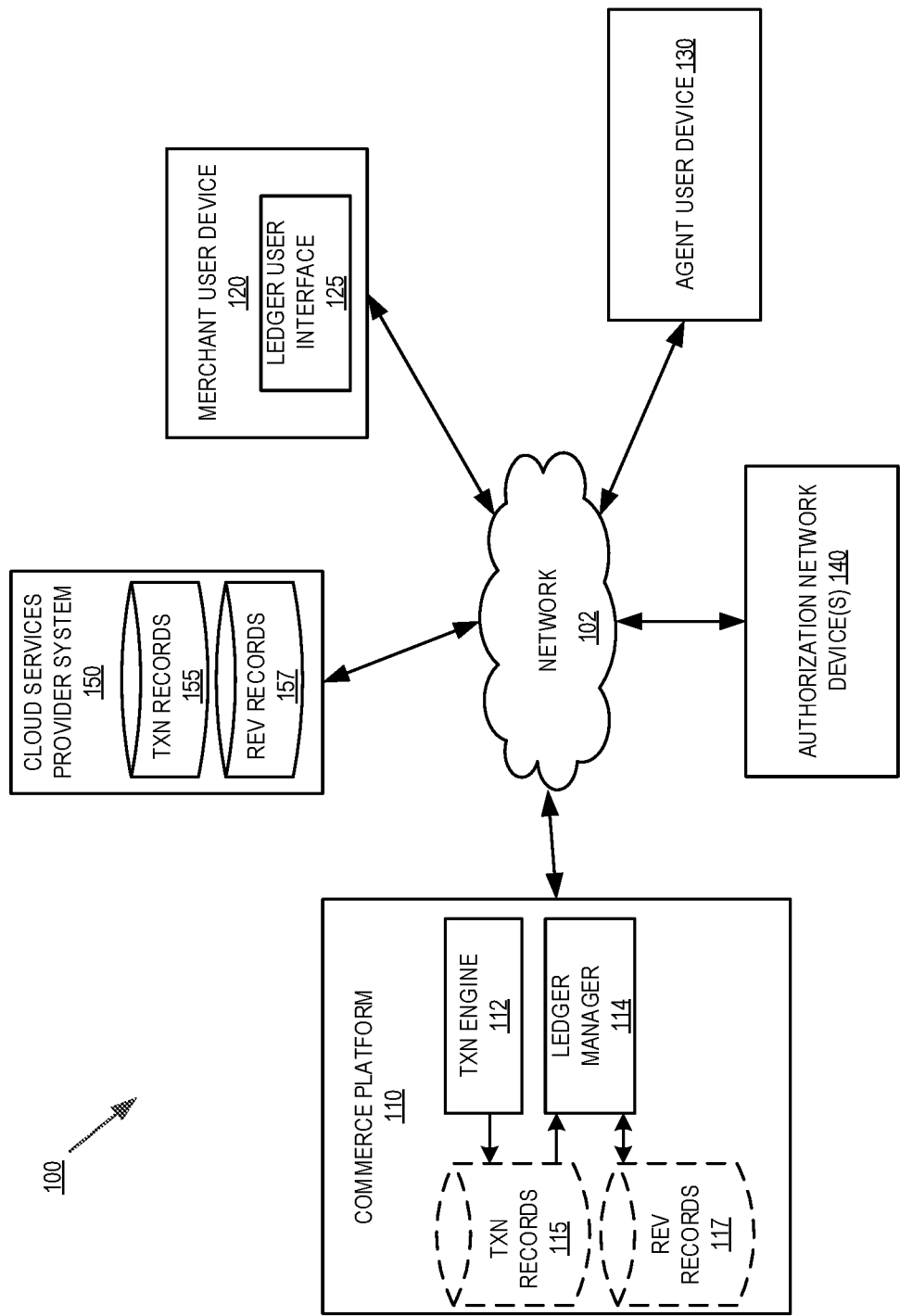
FIG. 1 is a block diagram of an exemplary system architecture for generating and using immutable records generated from transaction records maintained at a cloud storage system for ledger generation.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "accessing", "generating", "processing", "matching", "detecting", "setting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for generating and using immutable records generated from transaction records maintained at a cloud storage system for ledger generation. In one embodiment, the system 100 includes a commerce platform 110, a merchant user device 120, an agent user device 130, an authorization network user device 140, and a cloud services provider system 150. In one embodiment, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 and cloud services provider system 150 may also be one or more computing devices, such as one or more server computer systems, desktop computer systems, etc.

The commerce platform 110, merchant user device 120, agent user device 130, authorization network user device 140, and cloud services provider system may be coupled to a network 102 and communicate with one another using any of the standard protocols for the exchange of information, including secure communication protocols. In one embodiment, one or more of the commerce platform 110, merchant user device 120, agent user device 130, authorization network user device 140, and cloud services provider system 150 may run on one Local Area Network (LAN) and may be incorporated into the same physical or logical system, or different physical or logical systems. Alternatively, the commerce platform 110, merchant user device 120, agent user device 130, authorization network user device 140, and cloud services provider system 150 may reside on different LANs, wide area networks, cellular telephone networks, etc. that may be coupled together via the Internet but separated by firewalls, routers, and/or other network devices. In one embodiment, commerce platform 110 and/or cloud services provider system 150 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

In one embodiment, merchant system 120 does not handle financial transactions for the products and/or services which are provided by the merchant (e.g., merchant user device or other merchant systems) and/or agents (e.g., agent user device 130) of merchant. That is, when a product or service of the merchant system 120 is provided to a consumer (not shown), the merchant system 120 does not receive consumer payment information (e.g., credit card information, digital asset information, etc.), process payments from accounts associated with the payment information, credit the merchant upon successful payment collection, credit the agent/ user upon successful payment collection, etc. Instead, merchant system 120 utilizes the services of commerce platform 110 provided by transaction engine 112 to perform the financial transactions and/or processing when a merchant system 120 service and/or product is provided to a consumer by the merchant or a merchant's agent.

Thus, when a consumer pays for a good or service, the money paid by a financial institution (e.g., from one or more authorization network device(s) 140) on behalf of the customer may not go directly to the merchant. The money may first go to the commerce platform 110. More specifically, the merchant and/or agent may utilize software integrated within one or more application programming interfaces (APIs) and/or software development kits (SDKs) developed and distributed by the commerce platform system 110. Then, when a transaction between a customer and the merchant and/or agent occurs, the commerce platform 110 APIs and/or SDKs within the merchant/agent application either handover or redirect the financial processing aspects of the transaction to commerce platform 110, such as by interacting with transaction engine 112. In embodiments, transaction engine 112 is an API endpoint with which the API functions, routines, calls, etc. embedded and integrated within merchant/agent application may interact to handle all financial processing aspects of a transaction, such as clearing payment information within one or more authorization network device(s) 140, transferring money, making payouts, generating messages back to the merchant and/or agent of transaction authorization, as well as other aspects of handling transactions for the merchant and/or agents of the merchant. In embodiments, the transaction engine 112 may also be a processing endpoint executed by physical resources at the cloud services provider system 150 or one or more processing systems of the commerce platform 110.

Transaction engine 112 responsive to receiving and processing transaction messaging with the commerce platform 110 APIs and/or SDKs within the merchant/agent application to, for example, processes a payment for a good or service, and generates a corresponding record of the transaction in the transaction records data store 115. In embodiments, the transaction record is a data record in transaction record data store 115 and may include a plurality of fields including account numbers associated with a transaction (e.g., merchant account, agent account, as well as other accounts that are relevant to the transaction), transaction amount, transaction currency type, transaction description(s) (e.g., transaction type such as purchase, refund, reversal, correction, payout, transfer, credit, etc.), one or more timestamps for transaction milestones (e.g., initiated, cleared, paid out, reversed, etc.), as well as other information. Furthermore, commerce platform 110 may handle any number of types of transactions, such as purchases, account transfers, funds conversion, refunds, reversals, etc., where each transaction generates one or more transaction records.

Due to modern computer architecture design of distributed processing systems, such as is used to implement commerce platform 110, the transactions records data store 115 is a virtualized storage (e.g., illustrated in dashed line) provided by cloud services provider system 150. Furthermore, transaction engine 112 is a real time transaction streaming and processing system that processes transactions as they occur. Thus, when transaction engine 112 writes transaction records to the transaction record data store 115 in response to the processing of transactions, the transaction records are written to virtualized storage resources, with corresponding physical storage of those transaction records occurring at one or more of storage resources provided by the cloud services provider system 150. Furthermore, for transactions that may retroactively impact prior transactions, the real time streaming transaction processing approach implemented by transaction engine 112 typically overwrites or replaces the transactions. Thus, when later analytical processes, such as ledger manager 114 seeks to generate one or more account summaries, such a ledger account summary showing account status on a per-transaction basis for a period of time, there is a potential for mismatched reports depending on when the reports are generated. Thus, potential conflicts in historic records may be encountered due to the different processing approaches of the transaction engine 112 (e.g. real-time streaming transaction processing) and ledger manager (e.g. periodic processing of current and past periods, where certain records may be altered, replaced, reversed, etc.). As will be described in greater detail below, revenue records are generated by the ledger manger 114 on a periodic basis to prevent such mismatches in account summaries. Furthermore, as will be discussed in greater detail below, the revenue records are data structures, data objects, or other data elements periodically generated by ledger manager 114 from transaction records and stored in a virtualized data store, and in particular the revenue records data store 117, for which the cloud services provider system 150 provides corresponding storage resources for physical storage of the revenue records data store 157.

In embodiments, commerce platform 110 may then periodically and/or on demand generate an account report for a merchant to accurately regenerate account summaries from any period of time, such that no matter when they are generated, the account summaries are consistent as the revenue records generated by ledger manager 114 enable immutable historic transaction recreation. In embodiments, ledger manager 114 then utilizes the transaction records maintained in transaction records data store 115 to periodically (e.g., every day, week, month, quarter, etc., or as requested) generate one or more ledger user interface(s) 125. In embodiments, ledger user interface 125 is a graphical user interface that details the transactions for a given account maintained by the commerce platform 110, such as a merchant account maintained on behalf of the merchant associated with merchant user device 120. In embodiments, the ledger user interface 125 is similar to a traditional ledger and shows money movement (e.g., into and out) of the merchant's account for the relevant time period. In embodiments, the ledger information for a merchant account for a period of time may also be transferred to the merchant user device 120 as a data file, such as a spreadsheet, database object, xml document, or other file for storing the data of the ledger summary (e.g., history of transactions and money movements for a period of time) of the merchant's account for the period of time.

As noted above, modern computer architecture design of distributed processing systems, such as commerce platform 110, in which transactions records in data store 115 is a virtualized storage and for which transactions are handled in a real-time streaming approach, the periodically generated ledger user interface(s) 125 and/or files for storing the data of the ledger summary(s) are regenerated on a periodic basis (e.g., hourly, daily, weekly, monthly, etc.) for any period of time for which transaction records are available. The ledger summary is regenerated by ledger manager 114 to ensure accuracy and completeness, because there are complex accounting interactions between different events that occur at different times. For example, a paid invoice could be refunded months after an initial transaction, and the invoice and refund are both recomputed in order to correctly adjust the amount of revenue that will be generated. Thus, ledger manager 114 rebuilds the ledger account summary(s) (e.g., ledger user interface(s) that render the account summary information and/or data files with the ledger summary information) for merchant accounts on a periodic basis for any period in a history that contains transaction records associated with the merchant.

In embodiments, the rebuilding of ledger summary(s) by the ledger manager 114 involves the ledger manager periodically accessing the transaction records data store 115 for the records maintained at cloud services provider system 150. However, as discussed herein, several problems are introduced by the periodic regeneration of ledger summary(s). Accounting level accuracy is required of the ledger summary(s), such that a ledger account summary for the merchant associated with merchant user system 120 for the first quarter of 2015 should be the same whether generated in the second quarter of 2015 or generated in 2020. However, there are potential transaction types, such as refunds, corrections, etc. that retroactively impact prior transactions. Thus, a rebuilding of ledger summary(s) could inadvertently alter a transaction summary by editing, rewriting, or otherwise altering a historical transaction with a later modification. Then, if the merchant associated with merchant user system 120 were to review their ledger summary generated before and after the later revision, their summary would not match. Because such ledger summary(s) are used by merchants to balance, observe, and clear their books, having mismatched summaries is not desirable as it fails to provide requisite accounting level accuracy and consistency. For example, an original transaction $T_i$ may be for $100 at period $P_1$, but a later transaction $T_j$ may seek to retroactively correct $T_i$ from period $P_1$ to $101 at period $P_N$. The correction, with the real-time streaming transaction processing performed by transaction engine 112 would then retroactively alter the prior transaction $T_i$ to reflect the correction $T_j$. Then, during a periodic ledger summary rebuilding at the different time periods $P_1$ and $P_N$, would result in a mismatch causing problems for a merchant that has closed their books for period $P_1$ if reviewing and comparing their P1 account summary at time period PN. Furthermore, given the magnitude of transactions handled by commerce platform 110 on an hourly, daily, etc. basis, it is not uncommon for sets of transactions to appear virtual identical in timing, amount, accounts, etc., which may also cause confusion as to whether a transaction record is a repeat or a new/different record. Finally, the magnitude of transactions handled by commerce platform 110 creates a difficult computing problem, for which computational efficiency is desirable.

In embodiments, to address the computational goals and account level accuracy goals with a periodic rebuilding of ledger summary(s) from transaction records maintained at remote storage (e.g. at cloud services provider system 150), in embodiments, ledger manager 114 accesses the transaction records in transaction record data store 115 and generates a set of candidate ledger entries. The candidate ledger entries are data structures suitable for generating an account summary from for a specific merchant and/or an account. The period may be hourly, daily, weekly, monthly, and in embodiments, ledger manager accesses the transaction records in transaction records data store 115 on a daily basis. In embodiments, each candidate ledger entry is a data object that includes at least at least accounts information associated with funds movement, the amount and currency of the funds movement, and a time when the transaction occurred. An example embodiment of the data fields to be included in the candidate ledger entry are illustrated below:

| Candidate Ledger Entry Data Object | |
|---|---|
| Debit acct: | Accounts Receivable |
| Credit acct: | Deferred Revenue |
| Amount and currency | $100 USD |
| Timestamp | A timestamp (e.g., day, date, hour, minute, second, millisecond, etc.) of when a transaction occurred, and an associated period (e.g., the month of the timestamp) for which the transaction is relevant. |

In embodiments, as discussed above, since ledger entries and ledger account summaries are not maintained in a persistent state, the candidate ledger entries for all prior transactions are periodically regenerated, such as on a daily basis.

After generating the candidate ledger entries for a new period of time, ledger manager further accesses prior revenue records from revenue records data store 117. As will be discussed in greater detail below, the revenue records maintained in data store 117 are records associated with past transactions and include a unique key for uniquely identifying each past transaction so that similar transactions can be disambiguated, retroactively applied corrections, reversals, refunds, etc. can be identified as being distinct from the transaction they seek to alter, and so that optimization in revenue records can be realized to preserve computation resources. Each revenue record, in embodiments, is a data object that stores a subset of information associated with a transaction. In one embodiment, the revenue records includes a debited account, a credited account, an amount (e.g., a transaction amount and the associated currency used in the transaction), a timestamp indicating the accounting period when the transaction occurred, a linked billing model data field (e.g., an invoice identifier, an item identifier, or other source that identifies where the billing originated), a linked funding model data field (e.g. a charge identifier, a transaction reference identifier, or other identifier indicating source of funds), an event type which is an enumeration (e.g., string value, alphanumeric value, etc.) of possible event types or actions related to billing from a transaction record (e.g., enumeration values associated with, for example, invoice sent, invoice paid, charge paid, charge refunded, etc.) a transaction type which is also an enumeration (e.g., string value, alphanumeric value, etc.) of the possible types of transactions (e.g., enumeration values associated with, for example, billing for unbilled revenue, recognizing deferred revenue, payment of cash, etc.), as well as other information.

For example, in accounting, assets, expenses, losses, and contra revenue are associated with debit accounts, while liabilities, revenue, and gains are associated with credit accounts. Then, when a debit is applied to a debit account, the balance in the account goes up. However, when a debit is applied to a credit account, the balance goes down. Similarly, a credit account balance goes up when a credit is applied to the credit account, and a debit account balance goes down when a credit is applied to the debit account. Thus, a common and example ledger entry could include debiting Cash, and crediting Accounts Receivable. In this case, the debited account (i.e., Cash) goes up, while the credited account (i.e., Accounts Receivable) goes down. Thus, there is an important distinction between a debit account and a debited account. In embodiments, every ledger entry has one debited account and one credited account. Those particular accounts could be debit accounts or credit accounts, in any combination. The combination of whether an account is debited or credited, and what type of account it is, will determine if the account balance goes up or down. Furthermore, the revenue records discussed above, contain sufficient data fields to capture the uniqueness of each transaction.

In embodiments, after ledger manager 114 has generated revenue records for each transaction record, that includes data similar to the ledger summary information and additional information (e.g., timestamps, linked billing model, linked funding model, event type enumeration value, transaction type enumeration value), the additional information may be used to derive a unique data key from each revenue record for identifying and disambiguating between transactions in transaction data store 115. An example embodiment of a unique key generated from a revenue record for a given transaction below:

| Unique Key for a Revenue Record | |
|---|---|
| Debit acct: | Accounts Receivable |
| Credit acct: | Deferred Revenue |
| Amount and currency | $100 USD |
| Linked Billing Model | Invoice ID |

| Unique Key for a Revenue Record | |
|---|---|
| Linked Funding Model | (empty) |
| Event Type Enumeration | INVOICE_FINALIZED |
| Transaction Type Enumeration | BILLED REVENUE |
| Accounting period timestamp | 2020-07 |

In embodiments, the linked billing model data field and the linked funding model data field are optional to the extent that at least one of those fields, and sometimes both, are to be present within each revenue record generated by ledger manager 114. Furthermore, optional timestamps, such as a late effective date timestamp (e.g. indicating that a ledger entry occurred at a date later than a transaction records occurred at date) and/or a reversal date timestamp (e.g., indicating that a ledger entry appeared and then subsequently disappeared) may be stored in revenue records. In embodiments, in a high volume system, such as commerce platform 110, timestamps alone are not sufficient for uniquely identifying and disambiguating among transactions, as transactions may have identical amounts, timestamps, parties, or a combination thereof. Thus, the unique key values represent a set of data sufficient to uniquely identify each transaction given the volume and type of transactions processed by commerce platform 110. Furthermore, in embodiments, the optional timestamps may be omitted as the timestamps are not part of candidate ledger entries and thus are not used for matching, as discussed in greater detail below.

In embodiments, ledger manager uses the unique key (e.g. combination of data fields in the revenue record that uniquely identify prior transactions) to match against candidate ledger entries. In embodiments, the matching may be considered as an outer joining operation, where a matching of a revenue record to a ledger entry indicates that the candidate ledger entry has been observed before and can be converted to a final ledger entry in a set of final ledger entries from which a ledger account summary can be generated. Unmatched ledger candidates and unmatched revenue records, however, are returned for further processing.

In embodiments, the unique key matching performed by ledger manager 114 has three potential outcomes. In first potential key matching outcome, as discussed above, a unique key value from a revenue record may be matched against the data fields in a candidate ledger entry. In this first case, the candidate ledger entry is then finalized and added to a set of final ledger entries (e.g. ledger entries that represent actual transactions that are not retroactively impacted by a later transaction). In embodiments, this is the common case for most historic transaction data.

In a second potential key matching outcome, the matching may reveal zero or more candidate ledger entries with no matching revenue record (e.g., no revenue record has a unique key that can be used to identify the ledger entries). In this second case, the ledger entry is the result of a new transaction record for which a new candidate ledger entry was generated, and thus ledger manager 114 generates a new revenue record with the appropriate data for generating the unique key, which can be obtained from the candidate ledger entry data object and/or associated transaction record from which the candidate ledger entry was generated from. Furthermore, in the second case, the candidate ledger entry is added to the set of finalized ledger account entries. In embodiments, if the new ledger entry is generated for the accounting period in which it occurs, the optional late effective date timestamp can be set by ledger manager 114 to null. Conversely, if the new ledger entry is generated outside of the accounting period in which the transaction occurs, the optional late effective date timestamp can be set by ledger manager 114 to the current date.

In a third potential key matching outcome, a revenue record exists but a corresponding candidate ledger entry matching the unique key of the revenue record cannot be found by ledger manager 114. In this third case, a reversal of a prior transaction is determined to have occurred (e.g., a ledger entry should not exist but does), and the optional reversal date timestamp is set to the current date in the revenue record. In this third case, the optional revenue records reversal date is set to the current date, and the ledger manager generates two candidate ledger entries, a first candidate ledger entry at an original transaction date, and an inverted, second candidate ledger entry (i.e., switched debit and credit accounts) at a reversal date. The generated ledger entries are then converted to final ledger entries.

After the candidate ledger entries and revenue records are processed by ledger manager, the final set of ledger entries (e.g., those promoted from candidate to final ledger entry) are used by ledger manager to generate ledger account summaries for one or more merchant systems (e.g. merchant user device 120). The ledger account summary may take various forms, such a ledger user interface 125 that renders ledger account summaries for each period for which a summary is available, for period(s) selected by a merchant user within the leger user interface 125, for a period requested through the ledger user interface 125, etc. In embodiments, the ledger user interface may be a web page based graphical user interface generated by ledger manager 114. In other embodiments, the user interface 125 is an application based user interface populated with data transferred from ledger manager 114 for configuring and rendering the user interface within the application. Furthermore, the ledger account summary may be transmitted as a data file, such as a database file, xml file, comma separated file, or other formatted file, which the merchant user device 120 may use to analyze and view the ledger summary data (e.g., import the file's data into their own accounting systems).

In embodiments, the generated revenue records from the period are maintained in the revenue records data store 117, which in embodiments may be stored remotely at the cloud services provider system 150. Furthermore, the storage of the revenue records is performed by ledger manager 114 for analytical purposes independent of the real-time streaming performed by transaction engine 112. Thus, the ledger manager 114 deploys specific data structures, and analysis, so that the periodic analytical system of ledger manager 114 is compatible with the real-time streaming processing performed by commerce platform, while maintaining data integrity and consistency in ledger accounts summaries generated by ledger manager 114.

Figure 2:
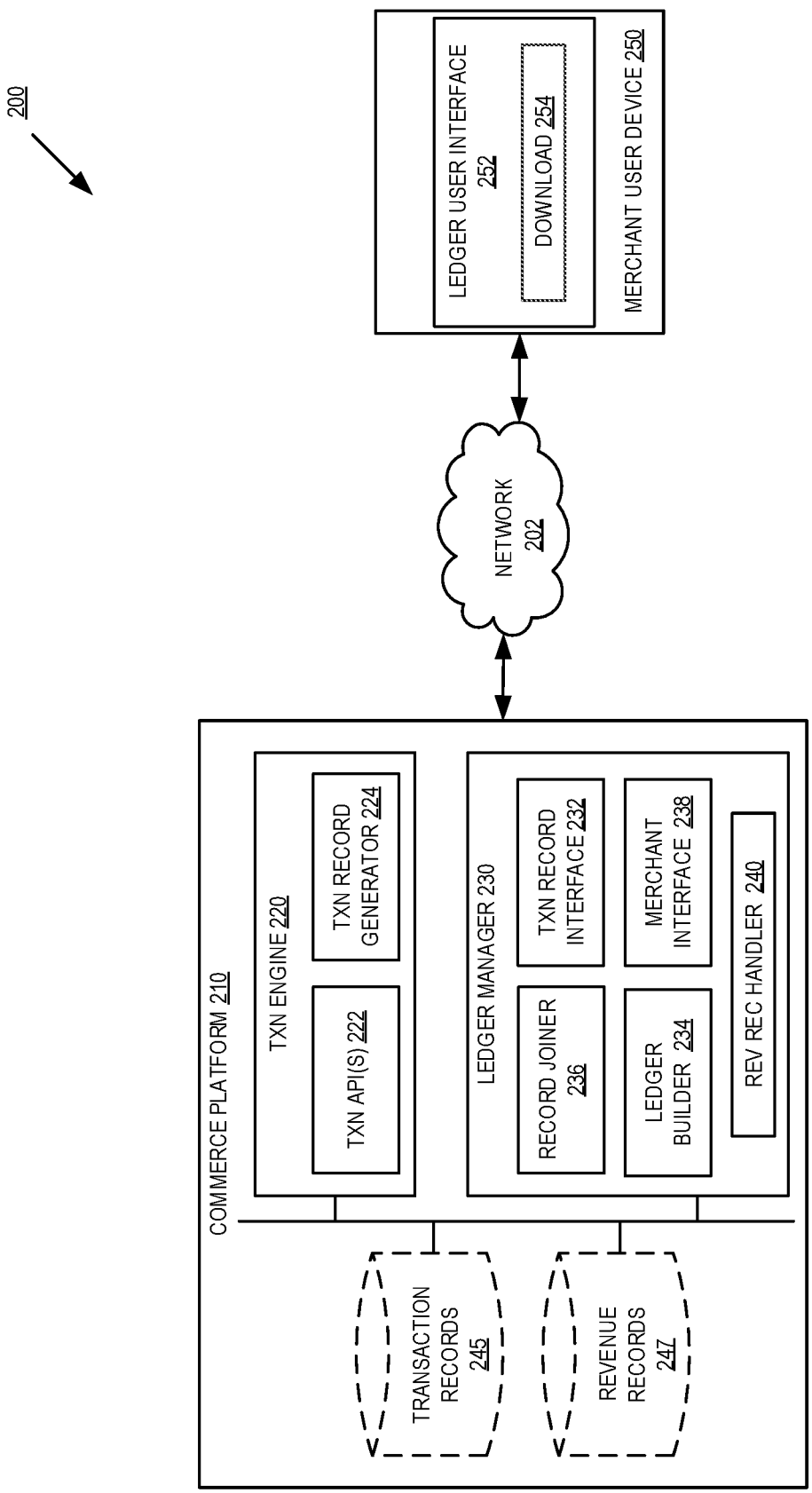
FIG. 2 is a block diagram of one embodiment of a commerce platform providing ledger generation to a merchant user device according to embodiments herein.

FIG. 2 is a block diagram of one embodiment 200 of a commerce platform 210 providing ledger generation to a merchant user device 250. Commerce platform 210 and user device 250 provide additional details for the corresponding devices/systems discussed above in FIG. 1.

In one embodiment, commerce platform 210 includes a transaction engine 220 with transaction API(s) 222 and transaction record generator 224. Transaction API(s) 222 are one or more application programming interface(s), such as processors, endpoints, etc. that receive transaction messaging from merchant and/or agents to perform transaction with customers of the merchant. As discussed above, for each type of transaction processed by the API(s) 222, transaction record generator 224 generates a transaction record having data fields, such as from account, to account, occurred at date, as well as other metadata that defines transaction parameters, type of transaction, etc. The transaction records are then stored in transaction records data store 245, which is illustrated in dashed line to indicate that in embodiments, the physical storage occurs at a cloud services provider system, as discussed above. Furthermore, transaction API(s) 222 perform real-time streaming transaction processing, which may include retroactively altering (e.g. correcting, reversing, refunding, etc.) prior transactions. For such transactions, the transaction API(s) 222 cause the transaction record generator 224 to alter, overwrite, or otherwise retroactively change the status/data of the prior transactions.

In embodiments, commerce platform 210 further includes a ledge manager 230 with a transaction record interface 232, ledger builder 234, record joiner 236, merchant interface 238, and revenue records (rev rec) handler 240. In embodiments, ledger builder 234 is responsible for generating ledger account summaries from sets of finalized ledger entry records. However, to avoid data inconsistencies in ledger account summaries generated at different periods of time, ledger manager includes transaction record interface 232 to access the transaction records in data store 245. As discussed herein, the transaction records are accessed periodically (e.g., daily, weekly, monthly, etc.) even though the data store 245 is updated in real-time as transactions are occurring. Then, ledger builder 234 generates a set of candidate ledger entry records for each prior transaction within data store 245. As noted above, a tuple of data is populated in each candidate ledger entry, including source account, destination account, amount, currency, a timestamp, as well as other data.

To avoid mismatches in ledger account summaries, record joiner 236 accesses previously generated revenue records in revenue records data store 247. The revenue records are also data objects that store a set of data in the data object's fields (e.g., linked billing model data and/or linked funding model data, event type enumeration value, and transaction type enumeration value, and in some embodiments optional timestamp data such as a late effective date timestamp and a reversal date timestamp), where the data populating those fields can be extracted from the transactions and/or candidate ledger entries from which the revenue record was generated. Record joiner 236 then matches revenue records from data store 247 with the candidate ledger entries generated by ledger builder 234. In embodiments, a unique key derived from each revenue record is generated from a combination of the data fields each revenue record enables record joiner 236 to uniquely and consistently match revenue records with candidate ledger entries. Then, as discussed above, for revenue records having a unique ID that matches a candidate ledger entry, the candidate ledger entry is added to a set of finalized ledger entries (or passed to a ledge account summary object, spreadsheet, data file, etc.). For candidate ledger entries with no matching revenue records as determined by record joiner 246, ledger builder 234 first builds a new revenue record (e.g. populates the record's data fields with the data from the candidate ledger entry and/or transaction record which is represented by the revenue record), stores the new revenue record in data store 247, and adds the candidate ledger entry (which now has a matching revenue record) to the final set of ledger entries. However, for revenue records with no matching candidate ledger entries as determined by record joiner 236, ledger builder generates a set of two or more ledger entries (e.g., an original leger entry at an original transaction date and a reversal ledger entry at a current data in which the unmatched revenue record is processed, or three ledger entries including the two ledger entries for a reversal and a ledger entry for a correction).

Ledger builder 245 then uses the final set of ledger entries to generate one or more ledger account summaries. The ledger account summaries are summaries of each transaction that shows funds flows into/out of a merchant's account, similar to a traditional ledger. However, merchant interface 238, responsive to merchant user device 250 requests, generates and transmits a ledger user interface 252. The ledger user interface may be a web page based user interface showing a ledger account summary to the merchant user device 252. Additionally, the ledger user interface 252 may enable download 254, which when selected by a user of merchant user device 250 within interface 252, causes merchant interface to generate and transfer a file combining the data used to generate the ledger account summary (e.g., a database file, an XML file, a spreadsheet, or other file).

Figure 3:
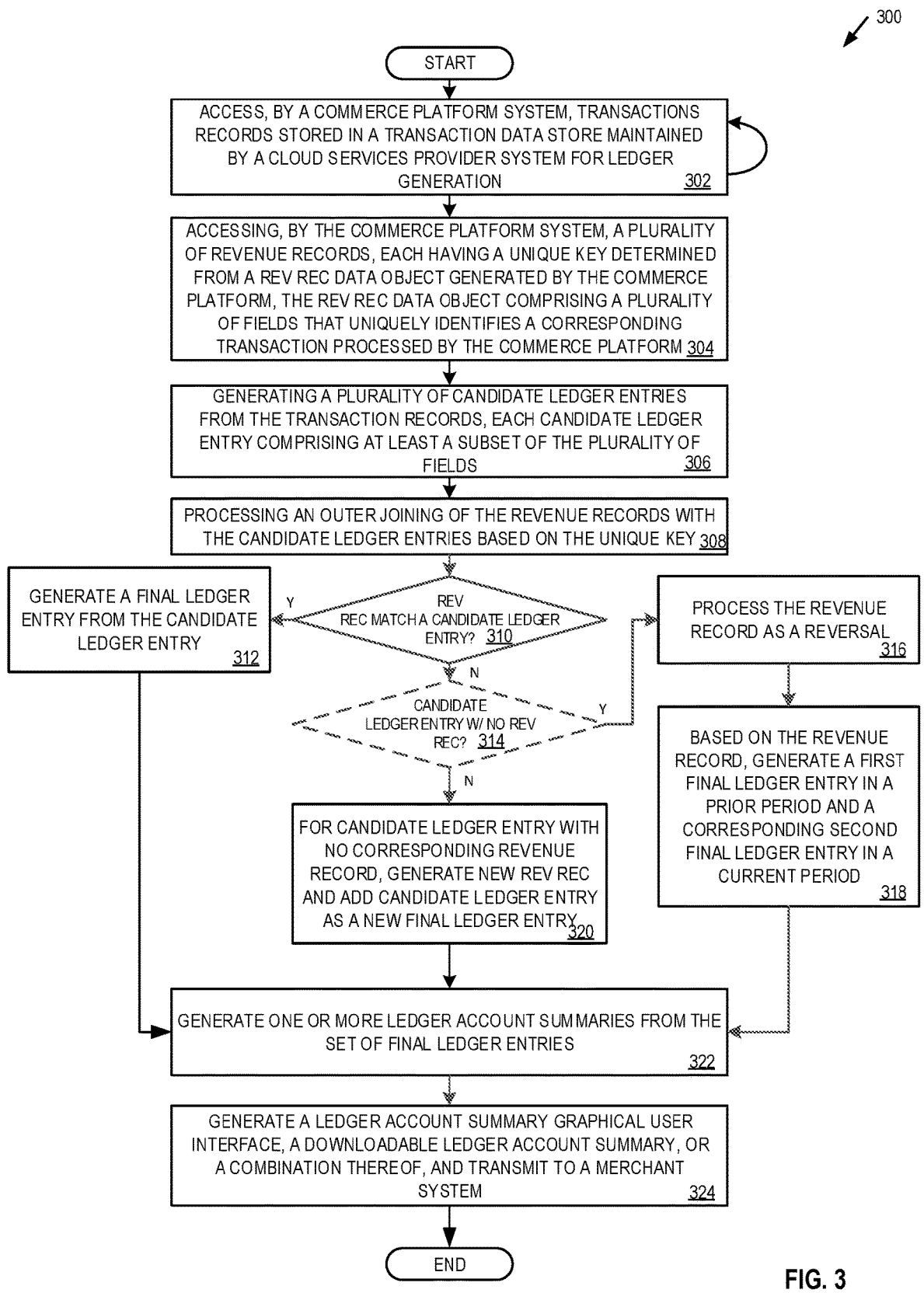
FIG. 3 is a block diagram of a computer implemented process for generating and using immutable records generated from transaction records maintained at a cloud storage system for transaction ledger generation.

FIG. 3 is a block diagram of a computer implemented process 300 for generating and using immutable records generated from transaction records maintained at a cloud storage system for transaction ledger generation. The process 300 is performed by processing logic that may comprise hardware (circuitry, dedicated logic, etc.), software (such as is run on a general purpose computer system or a dedicated machine), firmware, or a combination. In one embodiment, the process 300 is performed by a commerce platform system (e.g., commerce platform 110 or 210).

Referring to FIG. 3, processing logic begins by accessing transaction records in a transaction record data store maintained by a cloud services provider system for ledger generation (processing block 302). In embodiments, ledger generation is a periodic process perform by processing logic on a daily, weekly, monthly, etc., as well as on an on-demand basis. However, because of the distributed and real-time transaction processing architecture of the commerce platform, processing logic accesses all prior transaction records (e.g. for all prior periods). The transaction records, as discussed herein, store a collection of data and metadata that represent transaction elements.

Processing logic further accesses a plurality of revenue records, each having a unique key determined from a revenue record's data object generated by the commerce platform, the revenue record data object comprises a plurality of data fields that uniquely identifies a corresponding transaction processed by the commerce platform (processing block 304). In embodiments, the revenue records are maintained separately from the transaction records, and are stored remotely at a cloud services provider system. However, unlike transaction records, the revenue records are not generated by the real-streaming transaction processing, and are instead generated for periodic analytical analysis of ledger account summaries, as discussed herein. Embodiments of the various fields maintain in a revenue record are discussed above.

From the transaction records, processing logic further generates a plurality of candidate ledger entries, each candidate ledger entry comprises at least a subset of the plurality of data fields from the revenue record data object (processing block 306). Each candidate ledger entry represents a transaction record and the associated transaction, and includes data (e.g., from the subset) from which a ledger account summary can be generated. The subset may include, for example, source account, destination account, amount and currency of a transaction, transaction occurrence timestamp, as well as additional fields.

Processing logic then determines whether a revenue record matches a candidate ledger entry (processing block 310). In embodiments, the matching is performed using the revenue record's unique identifier, which as discussed herein include sufficient data to disambiguate and uniquely identify each transaction and corresponding candidate ledger entry given the volume and various types of transactions processed by the commerce platform system. When a match is found, processing logic generates a final ledger entry from the matching candidate ledger (processing block 312). That is, processing logic concludes that the matching of the revenue record with the candidate ledger entry signifies that candidate is an actual prior ledger entry from a period in which the revenue record was created and is not associated with a retroactively applied change.

When no match is found, processing logic determines if there is a candidate ledger entry with no matching the revenue record (processing block 314). That is, processing logic determines that there is a new candidate ledger which has no corresponding revenue record (e.g. from the current period), and therefore generates a new revenue record with data populating the revenue record fields extracted from the corresponding candidate ledger entry and/or transaction record (processing block 320). The new revenue record is generated to reflect the transaction's occurrence in the current period of time (e.g., the candidate ledger entry is a final entry in the current period of time), and may be stored with the prior revenue records, the candidate ledger entry passed through to processing block 322 as a final ledger entry for the current period of time. Furthermore, the timestamps for the candidate ledger entry informs processing logic as to whether the candidate ledger entry takes place in the current account period. When the candidate ledger entry is from the current accounting period, a final ledger entry can also be generated from the candidate ledger entry for the current accounting period. However, when the candidate is from a prior accounting period, the final ledger entry can also be generated for the current period, but data is added to the final ledger entry indicating that it is a correction that should have occurred in the accounting period corresponding to its timestamp.

When there is a revenue record with no corresponding candidate ledger entry, processing logic processes the revenue record as a reversal (processing block 316). Processing logic, based on the revenue record, generates a first final ledger entry in a prior period and a corresponding final ledger entry in a current period (processing block 318). The first final ledger entry in the first period, which corresponds to a time period in which the revenue record was created, swaps the source and destination accounts to reflect the reversal (e.g., the backing out of the prior transaction from a prior period of time). The inverse transaction for the current period of time reflects the disappearance of a corresponding candidate ledger entry (e.g. transaction record) during the current period of time. In some embodiments, where the reversal is a correction, a third ledger entry reflecting the corrected amount is further generated by processing logic having the updated/corrected transaction amount and currency. Additional reversals, such as double reversals may also be processed in block 318 by backing out a reversal to thereby restore a prior transaction.

In embodiments, decision box 314 is illustrated in dashed line as the determination is used, in embodiments, to separate reversals, corrections, refunds, etc. from the remaining revenue records/candidate ledger entries. Furthermore, in embodiments, the determination in processing block 314 may be performed by processing logic after block 308 as an optimization to perform the candidate ledger entry generation of blocks 316 and 318 as a parallel process with blocks 312 and 320.

At processing block 322, processing logic generates one or more ledger account summaries from the set of final ledger entries (processing block 322). In embodiments, the ledger account summaries are analytical summaries that illustrate and show funds flows within a period to which the ledger account summary pertains. For example, a ledger summary may be generated for July 2020, and therefore shows at least the transactions and amounts, beginning balance, and ending balance of a merchant account at the commerce platform for the period of July 2020. Furthermore, due to the use of the revenue records, the ledger account summary is consistent no matter when the summary is generated, even though the transaction records and transaction processing is performed using a real-time streaming approach. Additionally, reversals may processed in a parallel process to accelerate the finalization of the candidate ledger entries.

Processing logic then generates a ledger account summary graphical user interface, a downloadable ledger account summary, or a combination thereof, and transmits the generated GUI, download, or combination thereof to a merchant system (processing block 324).

The ledger account summary, as discussed herein, provides a consistent summary even in view of the modern architecture and implementation of the transaction processing of the commerce platform. Furthermore, the consistent summary is enabled through the use of the unique key within the revenue records data object, and comparison with candidate ledger entries, as discussed herein providing immutable records of the prior transactions. Beneficially, the real-time transactional system of the commerce platform remains unaltered to provide the service in the time frame (e.g. real-time) desired by the merchant systems, while also providing consistent period analytical tools and analysis the merchant systems in the form of consistent ledger account summaries.

Figure 4:
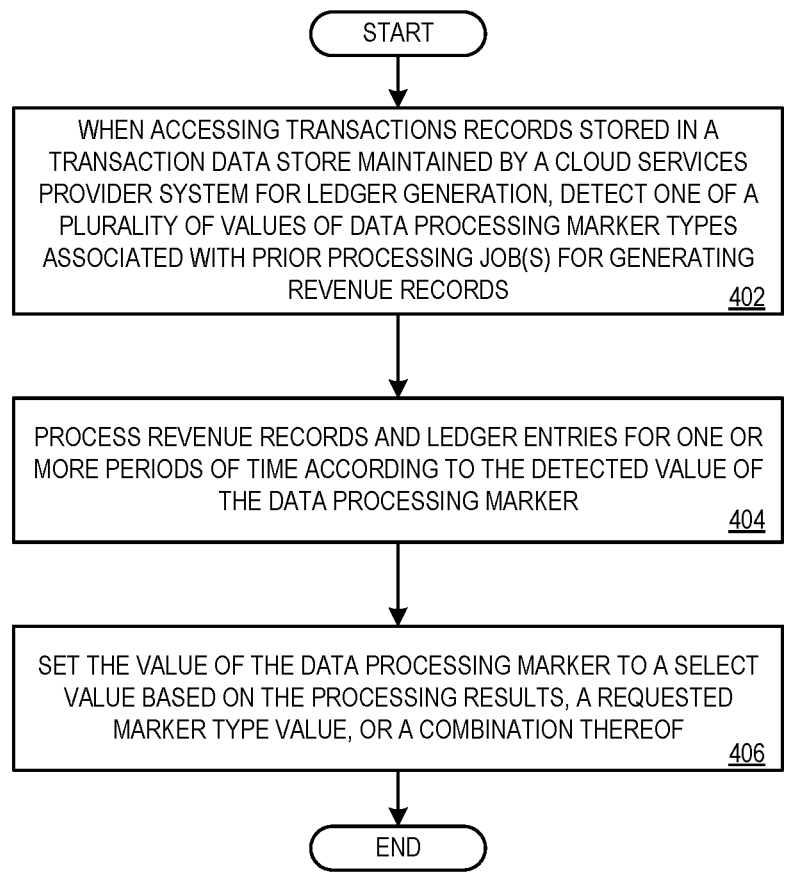
FIG. 4 is a block diagram of a computer implemented process of differentiating between immutable record building scenarios.

FIG. 4 is a block diagram of a computer implemented process 400 of differentiating between immutable record building scenarios. The process 400 is performed by processing logic that may comprise hardware (circuitry, dedicated logic, etc.), software (such as is run on a general purpose computer system or a dedicated machine), firmware, or a combination. In one embodiment, the process 400 is performed by a commerce platform (e.g., commerce platform 110 or 210).

Referring to FIG. 4, processing logic begins by, when accessing transaction records stored in a transaction data store maintained by a cloud services provider system for ledger account summary generation, detecting one of a plurality of values of data processing marker types associated with prior processing job(s) for generating revenue records (processing block 402). In embodiments, the marker type value causes alterations to the processing performed above in FIG. 3. Processing logic processes revenue records and candidate ledger entries for one or more periods of time according to the detected value of the data processing marker (processing block 404). In an embodiment, the marker type values represent various states of processing. For example, a first value may represent a first run of revenue record generation (e.g., no revenue records exist, and all candidate ledger entries would appear to be late). The first value is distinct from a second value that represents a successful processing job run. Additionally, a third marker type, which can indicate the skipping of one or more period of revenue record processing may also be used to, for example, handle system downtime, corruption, and other incidents that would prevent periodic (e.g., daily, hourly, etc.) processing as performed in FIG. 3, or when questioned results are detected. Yet another potential marker type may be set, for example at the request of a merchant system, to re-open a prior account period to adjust ledger entries associated with reversals or corrections in a period specified by the re-open marker, which does not discard old marker types.

In embodiments, when the first marker type is encountered, revenue records are generated for each candidate ledger entry automatically (e.g., automatically performing processing block 320 without performing blocks 310-312 or 314-318), and their status as late or reversed are not set. When the second marker type is encountered, normal processing is performed as discussed in FIG. 3. However, the third marker type skipping periods of time would cause the processing in FIG. 3 to look back to until a marker of the first or second type was found, and then use the historical data between a current period and the period in which the first or second marker types were encountered. Finally, certain requests from merchants may be to adjust prior ledger account summary periods (e.g., implement any corrections directly within the period), and the fourth marker type enables FIG. 3 to avoid blocks 314-318, and instead allow block 312 to make the candidate ledger entry corrections directly within a prior period.

Processing logic then sets the data processing marker to a select value based on the processing results, a requested marker type value, or a combination thereof (processing block 406). In embodiments, where processing occurs as expected, such as when no data corruption is detected, no service interruptions are detected, etc., the marker of the second marker type (e.g., success may be set). However, when an anomaly is detected, the third marker type (e.g., skip) could be set so that the period associated with the anomaly can be reprocessed on a next period. Additionally, specific merchant user's requests may be handled in response to receipt of requests to set the fourth marker type.

Figure 5:
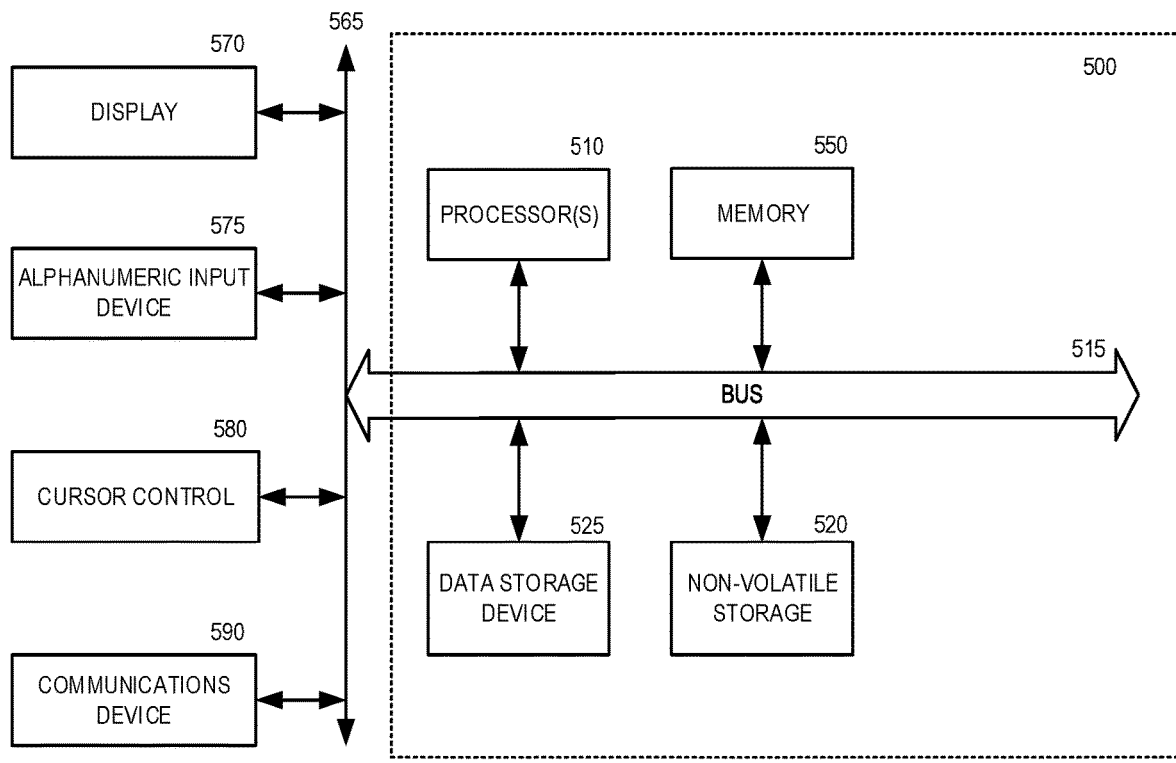
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant system, etc. It will be apparent to those of ordinary skill in the art, however that other alternative systems of various system architectures may also be used.

The data processing system illustrated in FIG. 5 includes a bus or other internal communication means 515 for communicating information, and one or more processor(s) 510 coupled to the bus 515 for processing information. The system further comprises a random access memory (RAM) or other volatile storage device 550 (referred to as memory), coupled to bus 515 for storing information and instructions to be executed by processor(s) 510. Main memory 550 also may be used for storing temporary variables or other intermediate information during execution of instructions by processor(s) 510. The system also comprises a read only memory (ROM) and/or static storage device 520 coupled to bus 515 for storing static information and instructions for processor(s) 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor(s) 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor(s) 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor(s) 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

Figure 6:
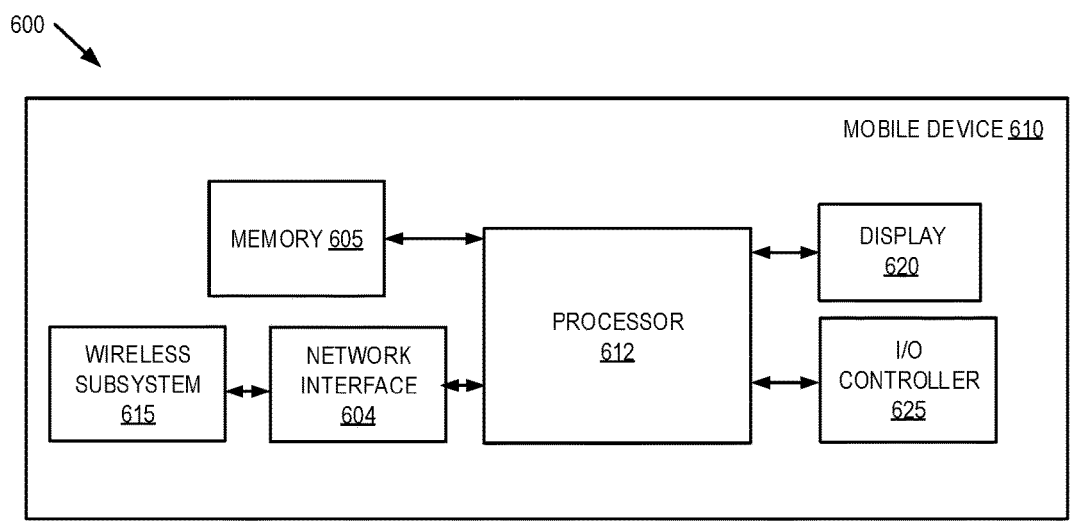
FIG. 6 is one embodiment of a mobile device that may be used to support the systems and operations discussed herein.

FIG. 6 is block diagram of one embodiment 600 of a mobile device. Mobile device 610 may be used, for example, as a merchant user device when interacting with the commerce platform for viewing and/or requesting ledger reports, as discussed herein. Furthermore, form components, fields, etc. may be additionally wrapped with tools that adapt their display within a form based on rendering on mobile device 610, as compared to when rendered by computer system 600. For example, when rendered on a mobile device, the user interfaces discussed herein may include larger buttons and inputs. As another example, buttons in footers may be stacked in a mobile rendering as compared to aligned horizontally in a rendering by other computing device.

In one embodiment, mobile device 610 is a system, which may include one or more processors 612, a memory 605, I/O controller 625, network interface 604, and display 620. Mobile device 610 may also include a number of processing modules, which may be implemented as hardware, software, firmware, or a combination. It should be appreciated that mobile device 610 may also include, although not illustrated, a user interface (e.g., keyboard, touch-screen, or similar devices), a power device (e.g., a battery), as well as other components typically associated with electronic devices. Network interface 604 may also be coupled to a number of wireless subsystems 615 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 604 and wireless subsystem 615 couple mobile device 610 to a network.

Memory 605 may be coupled to processor 612 to store instructions for execution by processor 612. In some embodiments, memory 605 is non-transitory. It should be appreciated that embodiments as described herein may be implemented through the execution of instructions, for example as stored in the memory 605 or other element, by processor 612 of mobile device 610 and/or other circuitry of mobile device 610 and/or other devices. Particularly, circuitry of mobile device 610, including but not limited to processor 612, may operate under the control of a program, routine, or the execution of instructions to execute methods or processes in accordance with the embodiments described herein. For example, such a program may be implemented in firmware or software (e.g. stored in memory 605 and/or other locations) and may be implemented by processors, such as processor 612, and/or other circuitry of mobile device 610. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 610 itself and/or some or all of the functions, engines or modules described herein may be performed by another system connected through I/O controller 625 or network interface 604 (wirelessly or wired) to mobile device 610. Thus, some and/or all of the functions may be performed by another system and the results or intermediate calculations may be transferred back to mobile device 610. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method for generating and using immutable records generated from transaction records maintained at a cloud storage system for transaction ledger generation, the method comprising:
   processing, by a server computer system, a stream of transactions in real-time as the transactions occur at the server computer system, wherein transaction records are generated for processed transactions and stored in a transaction record data store maintained by a cloud services provider system;
   at a periodic interval:
      accessing, by the server computer system, the transaction records in the transaction record data store for ledger generation,
      accessing, by the server computer system, a plurality of records, each having a unique key determined from a record data object generated by the server computer, the record data object comprises a plurality of data fields each indicative of a transaction parameter, and the plurality of data fields forming the unique key which uniquely identifies a corresponding transaction processed by the server computer,
      generating, by the server computer system, a plurality of candidate ledger entries, each candidate ledger entry generated from a transaction record and comprising at least a subset of the plurality of data fields from the record data object,
      determining, by the server computer system, whether a record matches a candidate ledger entry based on a comparison of the unique key to the subset of the plurality of data fields in the candidate ledger entry, and
      when the comparison results in a match, the server computer system generating a final ledger entry from the candidate ledger entry for a period of time in which the record was generated;
   generating, by the server computer system, a ledger account summary comprising at least the final ledger entry from the set of final ledger entries; and
   transmitting, by the server computer system over a network, a graphical user interface that depicts the ledger account summary to a merchant system having an account at the server computer system for which the ledger account summary was generated, wherein the graphical user interface causes a display device of the merchant to render the graphical user interface.

2. The method of claim 1, wherein when the comparison does not result in a match, the method further comprises:
   in response to determining that the candidate ledger entry does not match any of the plurality of records, generating a new record from the transaction record for which the candidate ledger entry was created, the candidate ledger entry, or a combination thereof, and wherein the record is associated with transactions that occur within a current period of time; and generating the final ledger entry from the candidate ledger entry for the current period of time; and adding the final ledger entry to the set of final ledger entries prior to generation of the ledger account summary.

3. The method of claim 1, wherein when the comparison does not result in a match, the method further comprises:

in response to determining that the record does not match any of the plurality of candidate ledger entries, generating a first final ledger entry in a prior period of time and a corresponding second, inverted final ledger entry in a current period, wherein the prior period of time is determined based on a time period in which the record was generated, and wherein the second, inverted final ledger entry swaps source and destination account information within fields of the first and second final ledger entries; and adding the first final ledger entry and the second, inverted final ledger entry to the set of final ledger entries prior to generation of the ledger account summary.

4. The method of claim 1, wherein the generating the ledger account summary comprises:

generating, by the server computer system, a data file comprising data indicative of the ledger account summary, the data file comprising a database file, a spreadsheet data file, or an extensible markup language (XML) data file; and transmitting, by the server computer system over a network, the data file to a merchant system having an account at the server computer system for which the ledger account summary was generated.

5. The method of claim 1, wherein each transaction record comprises a collection of data associated with a corresponding transaction processed by the server computer system, the collection of data containing at least a source account, a destination account, a transaction amount, a currency, a timestamp indicating when the transaction occurred at the server computer system, and metadata describing one or more transaction parameters.

6. The method of claim 1, further comprising:

when accessing transaction records stored in the transaction data store maintained by the cloud services provider system for ledger account summary generation, detecting one of a plurality of values of data processing marker types associated with prior processing performed by the server computer system for generating records;

processing records and candidate ledger entries for one or more periods of time according to the detected value of the data processing marker; and after the processing, setting the data processing marker to a select value based on a results of the processing, a requested marker type value, or a combination thereof.

7. The method of claim 6, wherein the plurality of values of data processing marker types comprise:

a first marker type indicative of no record having been previously generated by the server computer system, and wherein the processing of the records and candidate ledger entries for the one or more periods of time comprises generating records for each of the candidate ledger entries for each of the one or more periods of time;

the second marker type indicative of a prior successful processing of records and candidate ledger entries from a prior period of time, and wherein the processing the records and candidate ledger entries for the one or more periods of time comprises generating records for a current period of time;

a third marker type indicative of a command regenerate records from one or more of the periods of time from a current period of time in which the third marker type is detected to a period of time from the one or more periods of time when a marker having the first type or the second type is detected; and a fourth marker type indicative of a request from a merchant system to reopen one of the one or more periods of time, and for which records indicative of reversals or corrections are implemented in an original period of time of a corresponding transaction.

8. The method of claim 1, wherein the accessing is periodically performed on one of an hourly, daily, weekly, or monthly basis, and wherein the accessed transaction records comprise all transaction records maintained in the cloud services provider system for a server computer system regardless of a period in which the transaction records are accessed.

9. A non-transitory computer readable storage medium including instructions that, when executed by a processor, cause the processor to perform operations for generating and using immutable records generated from transaction records maintained at a cloud storage system for transaction ledger generation, the operations comprising:

processing, by a server computer system, a stream of transactions in real-time as the transactions occur at the server computer system, wherein transaction records are generated for processed transactions and stored in a transaction record data store maintained by a cloud services provider system;

at a periodic interval:

accessing, by the server computer system, the transaction records in the transaction record data store for ledger generation;

accessing, by the server computer system, a plurality of records, each having a unique key determined from a records data object generated by the server computer, the record data object comprises a plurality of data fields each indicative of a transaction parameter, and the plurality of data fields forming the unique key which uniquely identifies a corresponding transaction processed by the server computer;

generating, by the server computer system, a plurality of candidate ledger entries, each candidate ledger entry generated from a transaction record and comprising at least a subset of the plurality of data fields from the record data object;

determining, by the server computer system, whether a record matches a candidate ledger entry based on a comparison of the unique key to the subset of the plurality of data fields in the candidate ledger entry;

when the comparison results in a match, the server computer system generating a final ledger entry from the candidate ledger entry for a period of time in which the record was generated; and generating, by the server computer system, a ledger account summary comprising at least the final ledger entry from the set of final ledger entries; and transmitting, by the server computer system over a network, a graphical user interface that depicts the ledger account summary to a merchant system having an account at the server computer system for which the ledger account summary was generated, wherein the graphical user interface causes a display device of the merchant to render the graphical user interface.

10. The non-transitory computer readable storage medium of claim 9, wherein when the comparison does not result in a match, the method further comprises:

in response to determining that the candidate ledger entry does not match any of the plurality of records, generating a new record from the transaction record for which the candidate ledger entry was created, the candidate ledger entry, or a combination thereof, and wherein the record is associated with transactions that occur within a current period of time; and generating the final ledger entry from the candidate ledger entry for the current period of time; and adding the final ledger entry to the set of final ledger entries prior to generation of the ledger account summary.

11. The non-transitory computer readable storage medium of claim 9, wherein when the comparison does not result in a match, the method further comprises:

in response to determining that the record does not match any of the plurality of candidate ledger entries, generating a first final ledger entry in a prior period of time and a corresponding second, inverted final ledger entry in a current period, wherein the prior period of time is determined based on a time period in which the record was generated, and wherein the second, inverted final ledger entry swaps source and destination account information within fields of the first and second final ledger entries; and adding the first final ledger entry and the second, inverted final ledger entry to the set of final ledger entries prior to generation of the ledger account summary.

12. The non-transitory computer readable storage medium of claim 9, wherein the generating the ledger account summary comprises:

generating, by the server computer system, a data file comprising data indicative of the ledger account summary, the data file comprising a database file, a spreadsheet data file, or an extensible markup language (XML) data file; and transmitting, by the server computer system over a network, the data file to a merchant system having an account at the server computer system for which the ledger account summary was generated.

13. The non-transitory computer readable storage medium of claim 9, wherein each transaction record comprises a collection of data associated with a corresponding transaction processed by the server computer system, the collection of data containing at least a source account, a destination account, a transaction amount, a currency, a timestamp indicating when the transaction occurred at the server computer system, and metadata describing one or more transaction parameters.

14. The non-transitory computer readable storage medium of claim 9, further comprising:

when accessing transaction records stored in the transaction data store maintained by the cloud services provider system for ledger account summary generation, detecting one of a plurality of values of data processing marker types associated with prior processing performed by the server computer system for generating records;

processing records and candidate ledger entries for one or more periods of time according to the detected value of the data processing marker; and after the processing, setting the data processing marker to a select value based on a results of the processing, a requested marker type value, or a combination thereof.

15. The non-transitory computer readable storage medium of claim 14, wherein the plurality of values of data processing marker types comprise:

a first marker type indicative of no record having been previously generated by the server computer system, and wherein the processing of the records and candidate ledger entries for the one or more periods of time comprises generating records for each of the candidate ledger entries for each of the one or more periods of time;

the second marker type indicative of a prior successful processing of records and candidate ledger entries from a prior period of time, and wherein the processing the records and candidate ledger entries for the one or more periods of time comprises generating records for a current period of time;

a third marker type indicative of a command regenerate records from one or more of the periods of time from a current period of time in which the third marker type is detected to a period of time from the one or more periods of time when a marker having the first type or the second type is detected; and a fourth marker type indicative of a request from a merchant system to reopen one of the one or more periods of time, and for which records indicative of reversals or corrections are implemented in an original period of time of a corresponding transaction.

16. A system, comprising:

a memory; and a processor coupled with the memory, the processor configured to:

process a stream of transactions in real-time as the transactions occur at a server computer system, wherein transaction records are generated for processed transactions and stored in a transaction record data store maintained by a cloud services provider system;

at a periodic interval:

access the transaction records in the transaction record data store for ledger generation, access a plurality of records, each having a unique key determined from a records data object generated by the server computer, the record data object comprises a plurality of data fields each indicative of a transaction parameter, and the plurality of data fields forming the unique key which uniquely identifies a corresponding transaction processed by the server computer, generate a plurality of candidate ledger entries, each candidate ledger entry generated from a transaction record and comprising at least a subset of the plurality of data fields from the record data object, determine whether a record matches a candidate ledger entry based on a comparison of the unique key to the subset of the plurality of data fields in the candidate ledger entry, when the comparison results in a match, generate a final ledger entry from the candidate ledger entry for a period of time in which the record was generated, and generate a ledger account summary comprising at least the final ledger entry from the set of final ledger entries, and transmit, over a network, a graphical user interface that depicts the ledger account summary to a merchant system having an account at the system for which the ledger account summary was generated, wherein the graphical user interface causes a display device of the merchant to render the graphical user interface.

* * * * *